United States Patent Office 3,475,503
Patented Oct. 28, 1969

3,475,503
STABILIZATION OF 1,1,1-TRICHLOROETHANE
Wesley L. Archer, Midland, and Elbert L. Simpson, Auburn, Mich., assignors to The Dow Chemical Company, Midland, Mich., a corporation of Delaware
No Drawing. Filed Dec. 1, 1967, Ser. No. 687,091
Int. Cl. C07c 17/40, 17/42
U.S. Cl. 260—652.5          6 Claims

ABSTRACT OF THE DISCLOSURE

The reaction of 1,1,1-trichloroethane with aluminum is inhibited by the presence in the 1,1,1-trichloroethane of a small amount of a dissolved cyclic carbinol or corresponding mercaptan. Concentrations of the order of 0.005–1 gram mole per liter provide significant inhibition.

BACKGROUND OF THE INVENTION

This invention relates to the stabilization of chlorinated solvents. More particularly, the present invention concerns the stabilization of 1,1,1-trichloroethane in the presence of metallic aluminum.

Chlorinated hydrocarbons such as trichloroethylene and perchloroethylene are commonly used as solvents in chemical processes, dry cleaning, and metal degreasing. Solvents of this type are subject to slow decomposition and oxidation reactions, particularly in the presence of impurities such as water, traces of acid or metal salts. Corrosion of metal surfaces in containers and process equipment and deterioration of solvent quality by formation of acidic and colored byproducts thereby become serious problems. Inhibitors such as acid scavengers and antioxidants are commonly added to these solvents in order to prevent such degradative reactions. Inhibitor concentrations are normally of the order of one percent by weight or less.

1,1,1-trichloroethane poses a different and particularly difficult stabilization problem because of its unusual reactivity with certain metals, notably aluminum. Traces of metal salts, moisture, or other impurities are not needed to initiate the 1,1,1-trichloroethane-aluminum reaction, for this reaction occurs spontaneously on a freshly exposed aluminum surface with spectacular results, converting the solvent and the metal surface in a few minutes to a blackened mass of acidic, carbonaceous material and aluminum salts. Conventional acid acceptor stabilizers cannot be depended upon to inhibit the aluminum-1,1,1-trichloroethane reaction and suitable inhibitors must be discovered by independent investigation. The search has yielded few effective compounds and these show little or no obvious pattern of structure. Typical 1,1,1-trichloroethane formulations contain about five percent by weight of an inhibitor which is usually a combination of compounds to inhibit reaction of the solvent with a variety of metals.

SUMMARY OF THE INVENTION

It has now been found that the 1,1,1-trichloroethane-aluminum reaction can be substantially retarded or prevented by incorporating into the 1,1,1-trichloroethane an inhibiting amount of at least one compound of the formula

R—CH$_2$XH wherein R represents a radical which is furyl, formylfuryl, thenyl, methylthenyl, hydroxymethyltetrahydrofuryl, pyridyl, aminophenyl or methoxyphenyl and X represents oxygen or sulfur. Such compounds may be used alone or in any combination with each other or with other non-reactive conventional inhibitors.

DETAILED DESCRIPTION

Only a quantity of inhibitor compound sufficient to retard or to stop the reaction of aluminum and 1,1,1-trichloroethane need be used. Although any significant amount will provide some inhibition, preferably about 0.005–1.0 gram moles per liter of 1,1,1-trichloroethane composition is employed and about 0.01–0.1 gram moles is usually most preferred.

Compounds defined by the general formula set forth above were tested for inhibiting activity in elongated glass test tubes having an inside diameter of 0.8 cm. and 33 cm. in length. To each vertically disposed tube there was added 0.54 g. of essentially pure 16–32 mesh granular aluminum and a solution of the inhibitor in purified 1,1,1-trichloroethane to make a total volume of test mixture of 5 ml. The closed ends of the test tubes were then immersed in an oil bath held at a temperature sufficient to maintain the 1,1,1-trichloroethane solution in each tube at a steady reflux. The results listed in the following examples indicate the minimum concentration of the inhibitor found effective to provide complete inhibition of the 1,1,1-trichloroethane-aluminum reaction for 24 hours under these conditions. Prevention of the reaction for this length of time under the described conditions indicates capacity for effective inhibition for an indefinite period. Concentrations are given in gram moles per liter, this figure being convertible to weight percent by the equation $$\text{wt. percent} = \frac{(\text{moles/liter})(\text{mol. wt. of inhibitor})}{13.46}$$

For example, a concentration of 0.10 g. mole per liter of an inhibitor of molecular weight 134.6 is equal to 1.0 weight percent of that inhibitor.

| Compound name | Effective concentration gram moles per liter |
|---|---|
| Example No.: | |
| 1 ............ Furfuryl alcohol ................. | 0.009 |
| 2 ............ Furfuryl mercaptan ............... | 0.013 |
| 3 ............ 5-formylfurfuryl alcohol .......... | 0.02 |
| 4 ............ 2-thenyl alcohol .................. | 0.03 |
| 5 ............ 3-methyl-2-thenyl alcohol ......... | 0.02 |
| 6 ............ 2,5-tetrahydrofurandimethanol ..... | 0.03 |
| 7 ............ 2-pyridylcarbinol ................. | 0.04 |
| 8 ............ 3-pyridylcarbinol ................. | 0.05 |
| 9 ............ o-Aminobenzyl alcohol ............. | 0.04 |
| 10 ........... p-Methoxybenzyl alcohol ........... | 0.02 |

Results similar to those shown above are found when the stabilizing compound is thenyl mercaptan, pyridylmethyl mercaptan, methoxybenzyl mercaptan, or other mercaptan analog of an alcohol listed above.

Surprisingly, compounds of somewhat related structure such as benzyl alcohol and pyridine are relatively ineffective for the purpose, requiring concentrations at least ten times those shown to provide substantial inhibition.

We claim:
1. A 1,1,1 - trichloroethane composition stablized against reaction with aluminum by having dissolved therein a stabilizing amount of at least one compound of the formula

R—CH$_2$XH wherein R represent a radical which is 2-thienyl, methyl-2-thienyl or 2-furyl, and X represents oxygen or sulfur.
2. The composition of claim 1 wherein the stabilizing compound is present in a concentration of 0.005–1 gram mole per liter of composition.
3. The composition of claim 1 wherein R is 2-furyl and X is oxygen.

4. The composition of claim 1 wherein R is 2-furyl and X is sulfur.

5. The composition of claim 1 wherein R is 2-thienyl and X is oxygen.

6. The composition of claim 1 wherein R is 3-methyl-2-thienyl and X is oxygen.

References Cited

UNITED STATES PATENTS 2,371,645   3/1945   Aitchison _____ 260—652.5

FOREIGN PATENTS 572,707   10/1945   Great Britain.
765,522   1/1957   Great Britain.

LEON ZITVER, Primary Examiner

M. M. JACOB, Assistant Examiner

U.S. Cl. X.R.

252—170, 171, 172